UNITED STATES PATENT OFFICE.

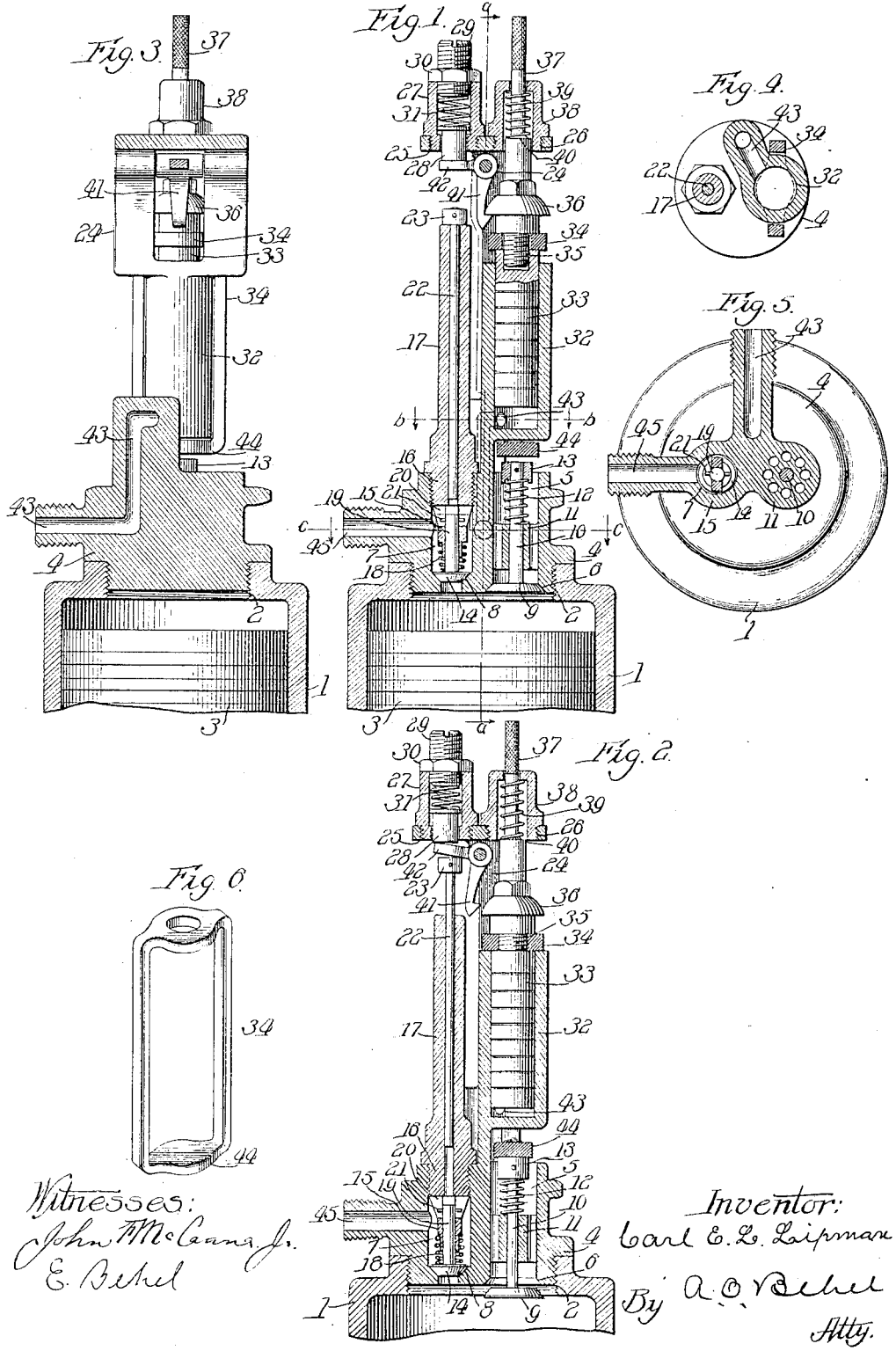

CARL E. L. LIPMAN, OF BELOIT, WISCONSIN, ASSIGNOR TO THE LIPMAN MANUFACTURING COMPANY, OF BELOIT, WISCONSIN, A CORPORATION OF WISCONSIN.

AIR-PUMP.

1,091,456.  Specification of Letters Patent.  Patented Mar. 24, 1914.

Application filed July 5, 1912. Serial No. 707,900.

*To all whom it may concern:*

Be it known that I, CARL E. L. LIPMAN, a citizen of the United States, residing at Beloit, in the county of Rock and the State of Wisconsin, have invented certain new and useful Improvements in Air-Pumps, of which the following is a specification.

The object of this invention is to automatically hold the intake valve open after a certain pressure has been reached, and to permit the inlet valve to close upon admitting air to operate a release for the valve.

In the accompanying drawings: Figure 1 is a vertical central section in which the air intake valve is closed. Fig. 2 is a similar section in which the air inlet valve is held open. Fig. 3 is a section on the line $a\ a$ of Fig. 1. Fig. 4 is a section on the line $b\ b$ of Fig. 1. Fig. 5 is a section on the line $c\ c$ of Fig. 1. Fig. 6 is a perspective view of the yoke.

In the drawings I have only shown the upper portion of a pump cylinder 1, having a screw-threaded opening 2. A piston 3 is located in the cylinder and can be reciprocated in the usual manner. Into the screw-threaded opening 2 of the cylinder, is turned a support 4 for the operative parts, which is formed with an air inlet opening 5 having a valve seat 6 and with an air outlet opening 7 having a valve seat 8.

An inlet valve 9 has its stem 10 guided by the apertured way 11 and has a spring 12 surrounding it and located between a collar 13 pinned to the stem and the way 11. The action of this spring is to hold the inlet valve closed.

An air outlet valve 14 is guided by the projection 15 depending from the screw-threaded end 16 of the plunger support 17, turned in connection with the support 4. A spring 18 surrounds the stem 19 of the outlet valve, having one end resting against the valve and its other end resting against the lower end of the projection 15. The action of this spring is to hold the outlet valve closed. The projection 15 has a transverse opening 20 which admits of a pin 21 being passed through the stem 19 of the air outlet valve, in order that when the plunger support 17 is removed the outlet valve will also be removed. A plunger 22 is located in the support 17 and has a head 23 on its upper end.

From the support 4 rises an arm 24 having two screw-threaded bearings 25 and 26. A tubular socket 27 has a screw-threaded connection with the bearing 25 and within it is located a headed plunger 28. An adjusting screw 29 is turned in connection with the upper end of the tubular socket 27 and a lock nut 30 holds the screw from accidental turning. A spring 31 is located in the tubular socket, one end resting on the plunger 28 and its other end resting against the screw 29. The action of this spring is to hold the plunger 28 down in a yielding manner.

The support 4 above the inlet valve is formed with a cylinder 32 within which is located a piston 33. A yoke 34 is fixedly connected to the upper end of the piston by the screw 35, having a tapered head 36 and an upward extension 37. Within the screw-threaded bearing 26 is located a tubular socket 38, through which the extension 37 passes. A spring 39 is located in the tubular socket 38, having one end resting against the upper end of the socket and its other end resting against a shoulder 40 forming an enlargement of the extension 37. To the arm 24 is pivoted a catch 41 having an extension 42. The extension 42 is located beneath the plunger 28, and the catch is adapted to receive the tapered head 36, as shown at Fig. 1. A port 43 communicates with the lower end of the cylinder 32 beneath the piston 33. The lower cross-bar 44 of the yoke 34 is located over the collar 13 pinned to the valve stem 10.

The pump herein described is intended particularly for furnishing air for self starters for automobiles and for inflating tires, and the piston 3 will reciprocate while the engine is running. When the pump is not supplying air the inlet valve 9 is held open as shown at Fig. 2, which will allow air to be taken in and expelled past the inlet valve. When air under pressure is admitted into the port 43, the piston 33 will be raised against the action of the spring 39 until the tapered head 36 is supported by the catch 41, Fig. 1. Upon the piston 33 being raised the lower bar 44 of the yoke 34 will be lifted free of the collar 13 on the valve stem 10 of the inlet valve, which will permit the spring 12 to close the inlet valve 9. The spring 31 serves to hold the catch 41 in engagement with the tapered head 36 of the piston 33 and hold it elevated. When the inlet valve 9 is free to open, air may be drawn in by the descent of the piston 3, and on the up-stroke of the piston the air will be expelled past the outlet valve 14 and by way of the port 45 to the tank or to the tire to be inflated. When a given pressure has been reached the plunger 22 will be raised against the extension 42 of the catch 41 sufficient to overcome the pressure of the spring 31, thereby withdrawing the catch 41 from beneath the tapered head 36 and allowing the spring 39 to force the piston 33 and yoke 34 down so that the lower crossbar 44 of the yoke will force the inlet valve 9 open against the action of the spring 12, when the piston 3 will move idly within the cylinder 1. The tension of the spring 31 determines the air pressure delivered by the pump and can be regulated by the adjusting screw 29.

I claim as my invention:

1. An air pump comprising a pump cylinder, a piston for the cylinder, an air inlet valve and an air outlet valve communicating with the pump cylinder, a cylinder, a piston for the cylinder having an engagement with the inlet valve, a spring operating on this piston, an air inlet to this cylinder beneath the piston, a catch for holding this piston raised, and means operated by air pressure for releasing the catch.

2. An air pump comprising a pump cylinder, a piston for the cylinder, an air inlet and an air outlet valve communicating with the pump cylinder, means movable in one direction to move the inlet valve to an inoperative position and air actuated in the opposite direction to permit said valve to operate, a catch for holding said means in its last-mentioned position, a spring for holding the catch in engagement with said means, and a plunger actuated by air from the exhaust of the pump and adapted to contact said catch and release it from engagement with the said means.

3. An air pump comprising a pump cylinder, a piston for the cylinder, an air inlet and an air outlet valve communicating with the pump cylinder, a second cylinder, a piston for this cylinder movable in one direction to move the inlet valve to an inoperative position, and a port in the last mentioned cylinder to allow air to enter and move the piston in the opposite direction to permit the inlet valve to operate.

4. An air pump comprising a pump cylinder, a piston for the cylinder, an air inlet valve communicating with the pump cylinder, a second cylinder, and a piston therefor movable in one direction to move said inlet valve to an inoperative position and air actuated in the opposite direction to permit said valve to operate.

5. An air pump comprising a pump cylinder, a piston for the cylinder, an air inlet and an air outlet valve communicating with the pump cylinder, a plunger movable in one direction to move the inlet valve to an inoperative position and air actuated in the opposite direction to permit the said valve to operate, means for maintaining said plunger in said latter position, and means operated by air pressure to actuate said first mentioned means and allow the plunger to be moved to its said former position.

6. An air pump comprising a pump cylinder, a piston for the cylinder, an air inlet and an air outlet valve communicating with the pump cylinder, a second cylinder, and a piston therefor, this piston movable in one direction to move the inlet valve to an inoperative position and air actuated in the opposite direction to permit said valve to operate.

In testimony whereof I have hereunto set my hand in presence of two subscribing witnesses.

CARL E. L. LIPMAN.

Witnesses:
A. O. BEHEL,
JOHN McCANN, Jr.

Copies of this patent may be obtained for five cents each, by addressing the "Commissioner of Patents, Washington, D. C."